UNITED STATES PATENT OFFICE.

ADOLF BAEYER AND VIGGO B. DREWSEN, OF MUNICH, BAVARIA, ASSIGNORS TO BADISCHE ANILIN AND SODA FABRIK, OF MANNHEIM, GERMANY.

PREPARATION OF MATERIAL FOR MANUFACTURE OF ARTIFICIAL INDIGO.

SPECIFICATION forming part of Letters Patent No. 257,812, dated May 9, 1882.

Application filed April 14, 1882. (No specimens.)

*To all whom it may concern:*

Be it known that we, ADOLF BAEYER, a subject of the King of Bavaria, and VIGGO BEUTNER DREWSEN, a subject of the King of Sweden and Norway, both residing at Munich, in the Kingdom of Bavaria, Empire of Germany, have invented new and useful Improvements in the Preparation of Materials used in the Manufacture of Artificial Indigo, of which the following is a specification.

This invention relates to the manufacture of orthonitrocinnamylformic acid, and particularly to the process employed for this purpose. The said acid is a material capable of being used for the manufacture of an artificial indigo, as hereinafter described.

In carrying out our invention we submit orthonitrobenzaldehyde to the action of pyroracemic (pyruvic) acid in the presence of hydrochloric acid. As an example of the manner in which we proceed, we take about ten parts, by weight, of orthonitrobenzaldehyde and dissolve the same in about six parts, by weight, of pyroracemic (pyruvic) acid with the application of a gentle heat. The solution thus obtained is then cooled down to about 10° centigrade and saturated with dry hydrochloric-acid gas. We then allow the mixture to stand from two to three days or until it has become solidified. The product thus obtained is then well mixed with water and washed until the hydrochloric acid has been removed, when the insoluble residue will principally consist of orthonitrocinnamylformic acid. A further purification of the same may be effected by crystallization from benzol.

Orthonitrocinnamylformic acid is distinguished by the following properties: It is a yellowish-white crystalline solid, easily soluble in alcohol, sparingly soluble in cold water. It is a strong organic acid, capable of forming salts with alkalies and salifiable bases. Its most characteristic property is the facility with which its alkaline solutions, containing an excess of the base, are decomposed under production of an artificial indigo. These solutions, upon being heated, or upon being allowed to stand at an ordinary temperature, gradually turn blue, owing to the formation of an artificial indigo. The formation of an artificial indigo from orthonitrocinnamylformic acid, however, forms the subject-matter of a separate application for a patent.

What we claim as new, and desire to secure by Letters Patent, is—

The within-described process for producing orthonitrocinnamylformic acid from orthonitrobenzaldehyde by the action of pyroracemic (pyruvic) acid in the presence of hydrochloric acid, substantially as described.

In witness whereof we have hereunto set our hands and seals in the presence of two subscribing witnesses.

ADOLF BAEYER.   [L. S.]
VIGGO BEUTNER DREWSEN.   [L. S.]

Witnesses:
ADOLF SPIEGEL,
LUDWIG LEHMANN.